United States Patent [19]
Phelps et al.

[11] Patent Number: 5,148,587
[45] Date of Patent: Sep. 22, 1992

[54] MULTI-PURPOSE PIPELINE CONSTRUCTION AND TESTING MACHINE

[76] Inventors: Carl R. Phelps; June T. Phelps, both of 234 Vernon La.; Douglas E. Phelps, 1024 Spell St., all of West Monroe, La. 71291

[21] Appl. No.: 599,416

[22] Filed: Oct. 18, 1990

[51] Int. Cl.⁵ .................... B23P 23/02; B23B 3/06
[52] U.S. Cl. ................... 29/33 T; 51/128; 82/113
[58] Field of Search ........... 20/33 T, 33 D, 560, 20/564, 27 R, 27 A, 27 C; 82/101, 113; 409/165, 166; 51/128, 116, 102, 208, 210

[56] References Cited

U.S. PATENT DOCUMENTS

| | | | |
|---|---|---|---|
| 1,745,699 | 2/1930 | Kleeb et al. | 82/101 |
| 3,187,738 | 6/1965 | Christopher | 82/113 |
| 3,572,199 | 3/1971 | Harden | 82/101 |
| 3,605,530 | 9/1971 | Doty | 82/113 |
| 3,753,320 | 8/1973 | Wurscher | 51/128 X |
| 3,762,624 | 10/1973 | Sprung | 72/393 X |
| 4,412,401 | 11/1983 | Fundell | 82/113 X |
| 4,625,464 | 12/1986 | Kubu | 82/113 X |

FOREIGN PATENT DOCUMENTS

| | | | |
|---|---|---|---|
| 27225 | 4/1981 | European Pat. Off. | 82/113 |
| 154967 | 9/1985 | European Pat. Off. | 51/128 |
| 107834 | 6/1984 | Japan | 29/33 T |
| 8603154 | 6/1986 | World Int. Prop. O. | 51/128 |

*Primary Examiner*—William Briggs
*Attorney, Agent, or Firm*—Brady, O'Boyle & Gates

[57] ABSTRACT

A multi-purpose, full service pipeline construction and testing machine wherein an internal combustion engine is mounted on a trailer adapted to be towed to a job site, the trailer having driven rollers for supporting pipe to be cut; a circular saw, a bevelling cutter and an abrasive wheel are rotatably mounted thereon for fabricating pipe to be assembled in a pipeline system. A water pump, hydrostatic pump and air compressor are also mounted on the trailer for testing the assembled pipeline for leaks. The internal combustion engine is operatively connected to the drive roller, circular saw, bevelling cutter, abrasive wheel, pumps and air compressor.

6 Claims, 7 Drawing Sheets

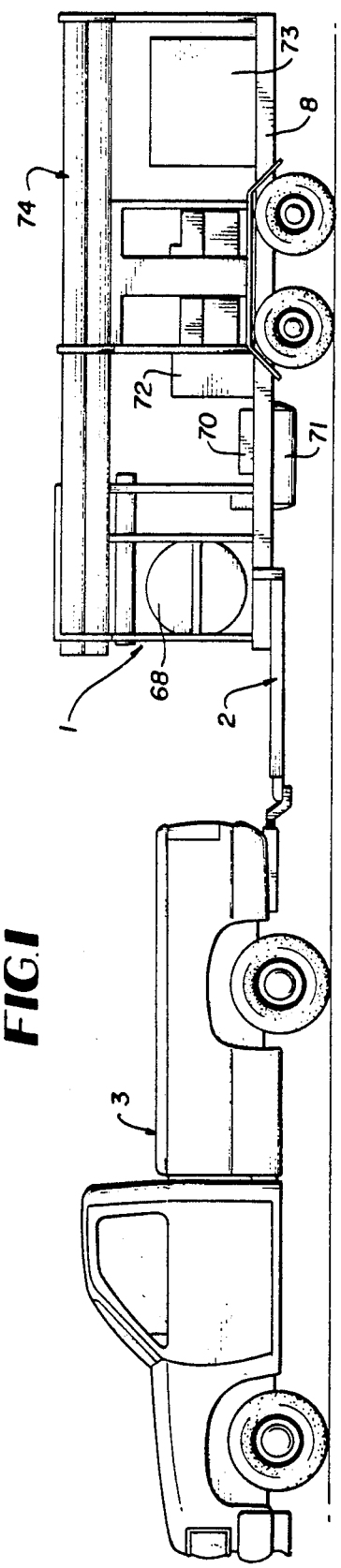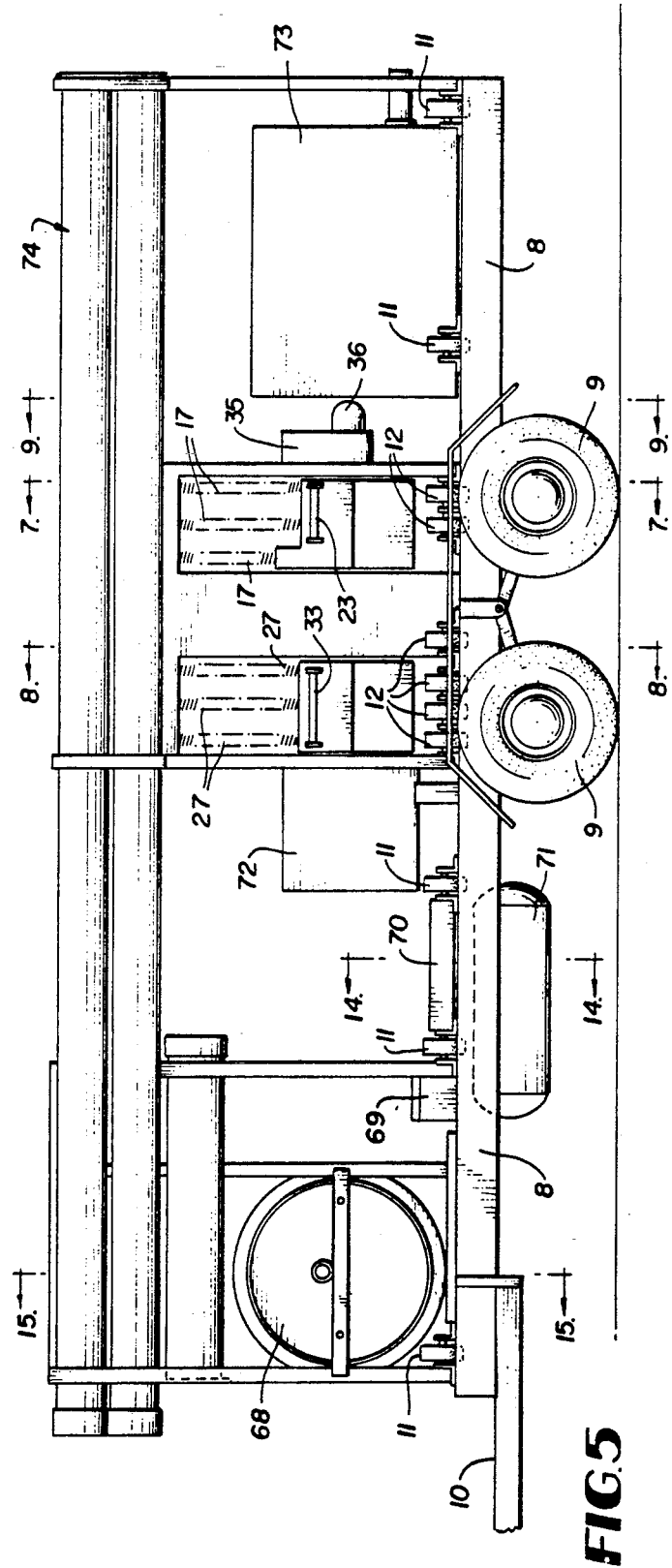

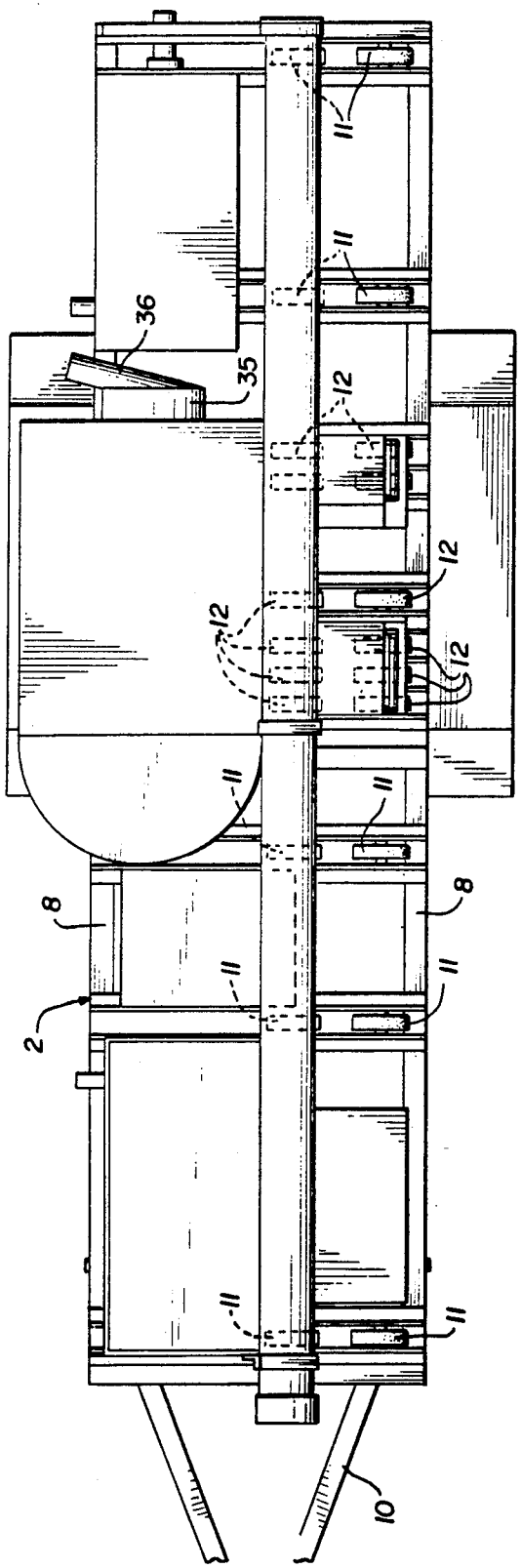
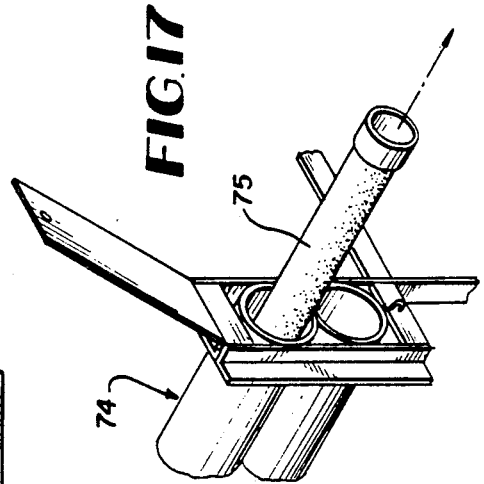
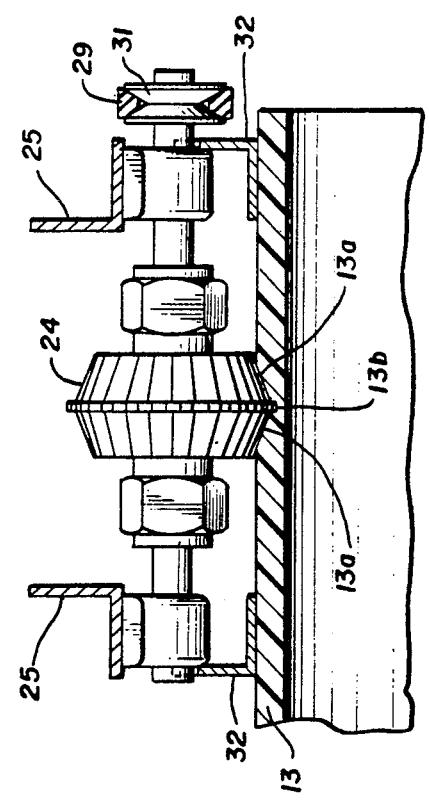

MULTI-PURPOSE PIPELINE CONSTRUCTION AND TESTING MACHINE

BACKGROUND OF THE INVENTION

Portable pipe cutting machines have been proposed as disclosed in U.S. Pat. Nos. 1,745,699 dated Feb. 4, 1930; 3,187,738 dated Jun. 8, 1965; and 3,572,199 dated Mar. 23, 1971; wherein rotatable rollers support a pipe to be cut by a saw mounted on a manually operable handle. While these machines have been satisfactory for their intended purpose, they have been somewhat limited to the specific function of merely cutting pipe.

In the laying of sewer, water and gas lines, the cutting of the pipe is incidental to the laying of the line. After the pipes have been connected, various tests, such as vacuum, hydrostatic and air, have to be made to insure that there are no leaks in the system. Heretofore, various apparatus had to be carried to the job site to perform the various operations of cutting and testing the pipes. After considerable research and experimentation, the multi-purpose pipeline construction and testing machine of the present invention has been devised wherein a vehicle towed trailer is provided with a single power source, such as an internal combustion engine, which is operably connected to a plurality of pipe support rollers which rotate a pipe while being cut by a circular saw blade, a bevel cutting blade or end-bevelled by a grinding wheel, each being operatively connected to the single power source which is also operably connected to a water pump, a hydrostatic pump, and an air compressor, whereby the pipe system can be tested for leaks.

The trailer also includes storage compartments for hoses and pipes to be constructed at the job site, a manhole test cover for use when performing a vacuum test, and meters and gauges for use when performing hydrostatic and vacuum tests.

By the construction and arrangement of the machine of the present invention, a multi-purpose or full service pipeline construction and testing machine is provided wherein all the apparatus for the installation of a sewer, water or gas line and the testing thereof, is provided on a trailer readily transportable to a job site, to thereby preclude the necessity of individually transporting all the required tools to the job site.

BRIEF DESCRIPTION OF THE DRAWINGS

FIG. 1 is a side elevational view of the trailer mounted apparatus of the present invention;

FIG. 5 is an enlarged, side elevational view of the trailer mounted apparatus shown in FIG. 1;

FIG. 6 is a top plan view of the apparatus illustrated in FIG. 5;

FIG. 11 is a view taken along line 11—11 of FIG. 8:
FIG. 17 is a fragmentary perspective view showing a hose storage compartment.

DESCRIPTION OF THE PREFERRED EMBODIMENT

Figure 2:
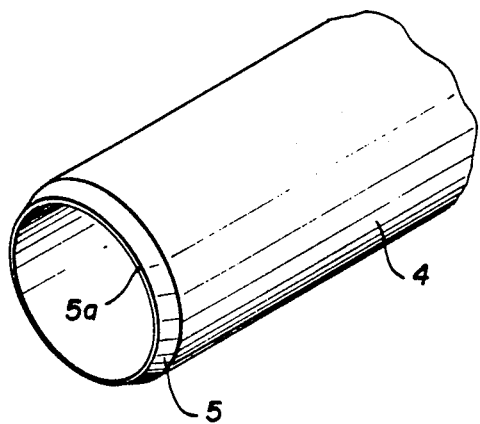
FIG. 2 is a fragmentary perspective view of the end of a pipe bevelled by the apparatus of the present invention.
Figure 3:
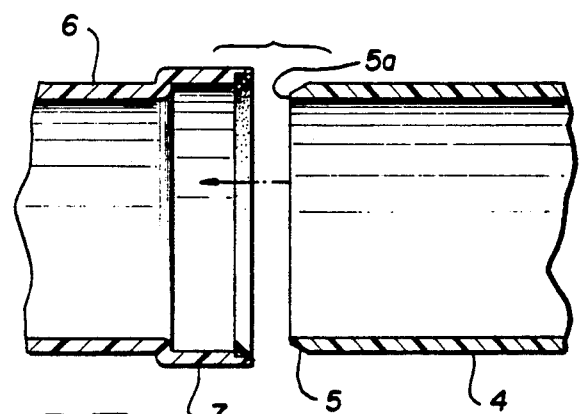
FIG. 3 is a fragmentary, side elevational, sectional view showing a pair of pipes being end connected.
Figure 4:
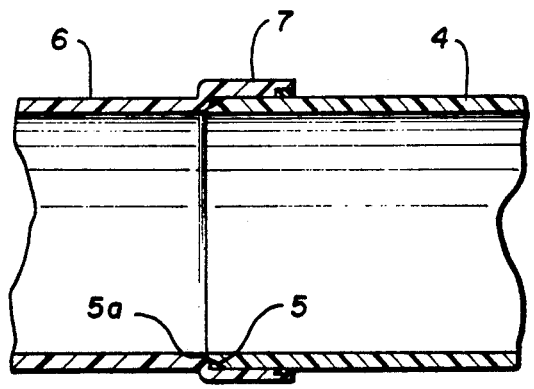
FIG. 4 is a fragmentary, side elevational, sectional view showing the pipes of FIG. 3 being connected.

Referring to the drawings and more particularly to FIG. 1, the apparatus 1 of the present invention is mounted on a trailer 2 adapted to be towed by a vehicle 3 to a job site, wherein a pipe 4, as shown in FIG. 2, having a diameter from 6" to 36" can be cut and bevelled to form a tapered surface as at 5 and a radial surface 5a for end-to-end sealing connection with an adjacent pipe 6 having a bell mouth 7 as shown in FIGS. 3 and 4; the pipes can be constructed of plastic, such as polyvinylchloride (PVC), or metal.

Figure 12:
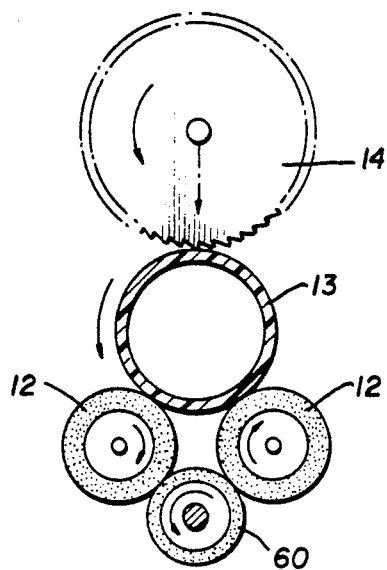
FIG. 12 is an elevational end view of a pipe cutting saw and support rollers as shown in FIG. 7.
Figure 14:
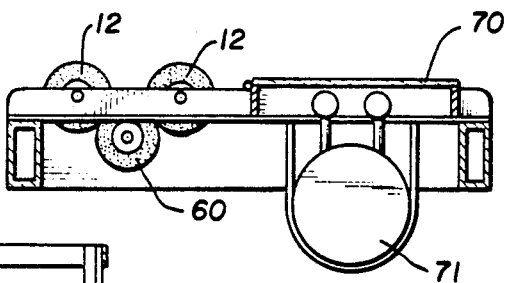
FIG. 14 is a view taken along line 14—14 of FIG. 5.
Figure 15:
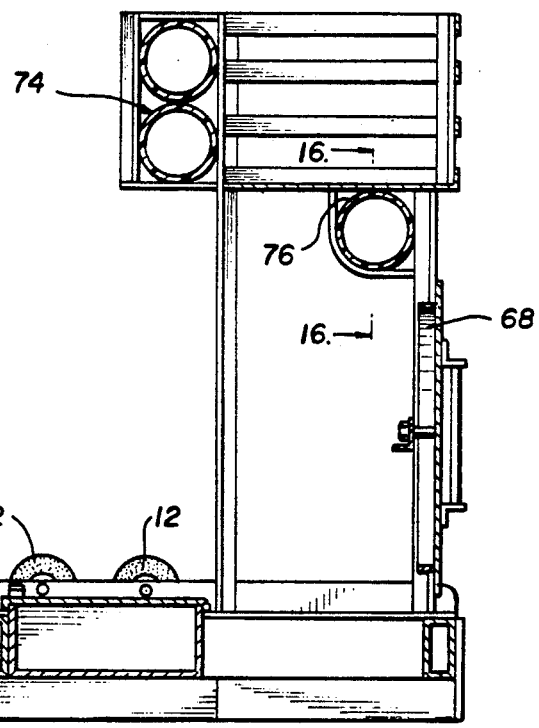
FIG. 15 is a view taken along line 15—15 of FIG. 5.
Figure 16:
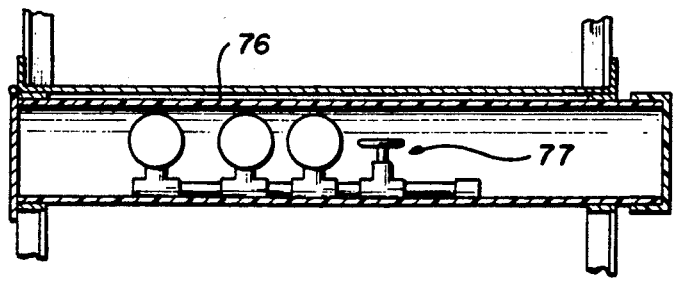
FIG. 16 is a view taken along line 16—16 of FIG. 15.

As will be seen in FIGS. 5 and 6, the trailer comprises a chassis frame 8 supported by tandem wheels 9 and connectable to the hitch of the vehicle by a tow bar 10. The trailer frame 2 is provided with a plurality of laterally disposed, axially spaced idler rollers 11, and drive rollers 12 for supporting a pipe 13 to be cut, as shown in FIG. 12.

Figure 7:
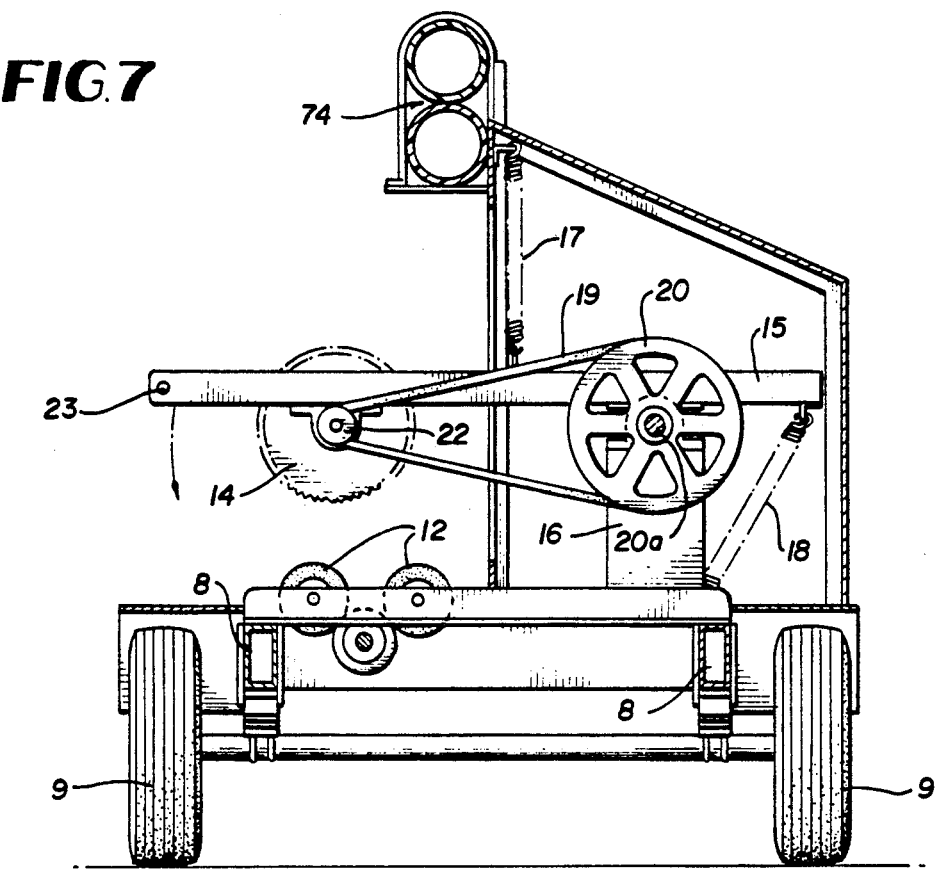
FIG. 7 is a view taken along line 7—7 of FIG. 5.

Referring to FIGS. 5 and 7, a circular saw 14 is rotatably mounted on the end portion of an arm 15 pivotally mounted on a pedestal 16 rigidly connected to the trailer frame. A plurality of tension springs 17 and 18 are operatively connected between the arm 15 and trailer chassis to bias the circular saw 14 to the neutral or non-cutting position as shown in FIG. 7. A drive belt 19 is connected between a drive pulley 20 mounted on a drive shaft 20a, and a driven pulley 22 connected to the saw blade 14, whereby the saw blade 14 is power driven. To provide a pipe with a straight-through cut, the pipe 13, as shown in FIG. 12, is placed on the drive rollers 12 and the rotating saw blade 14 is moved downwardly against the pipe 13 by the operator grasping the handle 23 and moving the arm in the direction of the arrow. When the pipe has been cut, the operator releases the handle and the springs 17 and 18 return the arm 15 and associated blade 14 to the non-cutting or neutral position.

Figure 8:
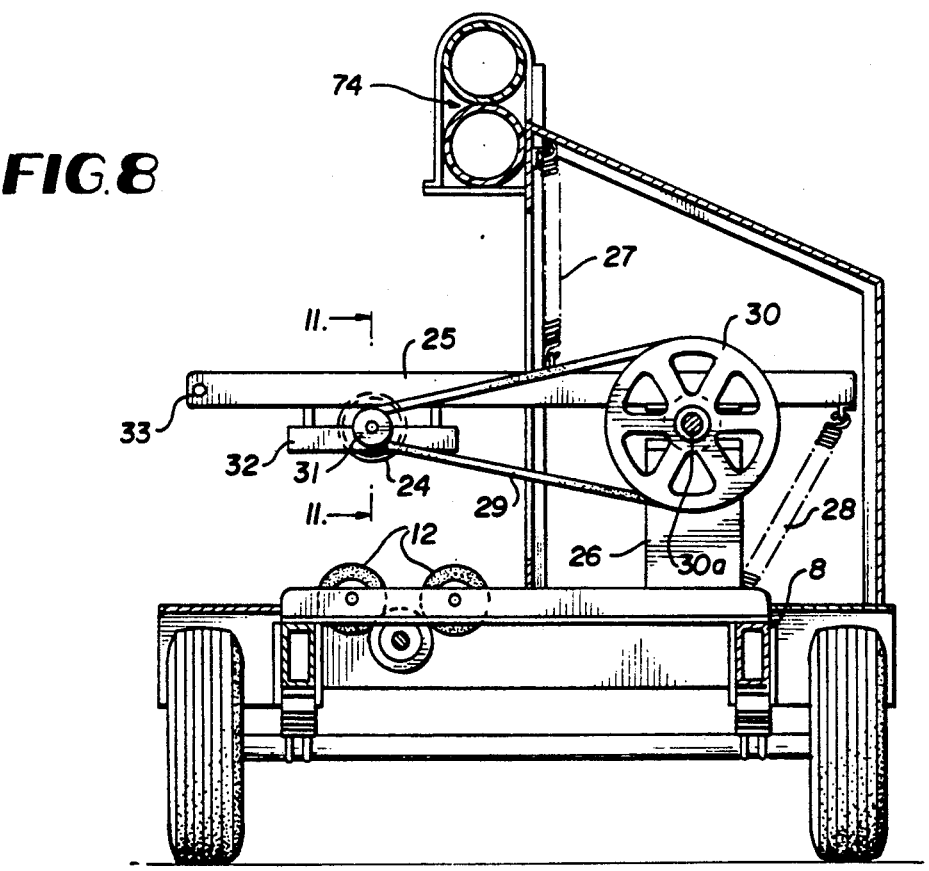
FIG. 8 is a view taken along line 8—8 of FIG. 5.
Figure 9:
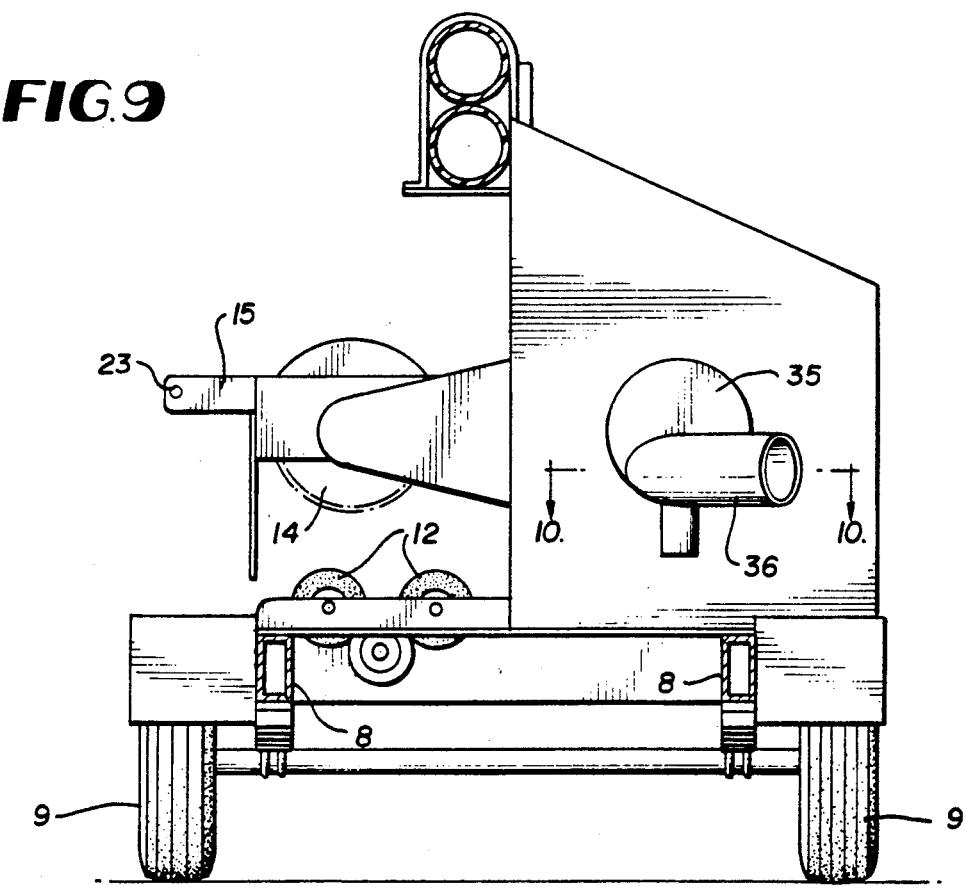
FIG. 9 is a view taken along line 9—9 of FIG. 5.

As will be seen in FIGS. 5, 8 and 11, a bevelling cutter 24 is rotatably mounted on the end portion of an arm 25 pivotally connected to the upper end portion of a pedestal 26 rigidly connected to the trailer frame 8. A plurality of tension springs 27 and 28 are operatively connected between the arm 25 and trailer chassis to bias the bevelling cutter 24 to the neutral or non-cutting position as shown in FIG. 8. The cutter is driven by a drive belt 29 connected between a drive pulley 30, secured to drive shaft 30a and a driven pulley 31 secured to the cutter 24. A depending gauge bar 32 is suspended from the arm 24, and is adapted to engage the surface of the pipe 13 being cut to limit the depth of the bevelled cut as shown in FIG. 11. To move the bevelling cutter 24 downwardly against the pipe 13, the operator grasps the arm handle 33 and manually moves the arm 25 and associated cutter 24 against the pipe 13 until the gauge 32 engages the pipe 13. The operator then releases the handle 33 and the springs 27 and 28 return the arm 25 to the non-cutting position. The partially cut pipe 13 is then moved under the circular saw 14 which is operated to cut radially through the pipe 13, whereby each piece of pipe is provided with a tapered or bevelled surface 13a and a radial surface 13b which correspond to the bevelled or tapered surface 5 and radial surface 5a of pipe 4, illustrated in FIGS. 2 and 3.

Figure 10:
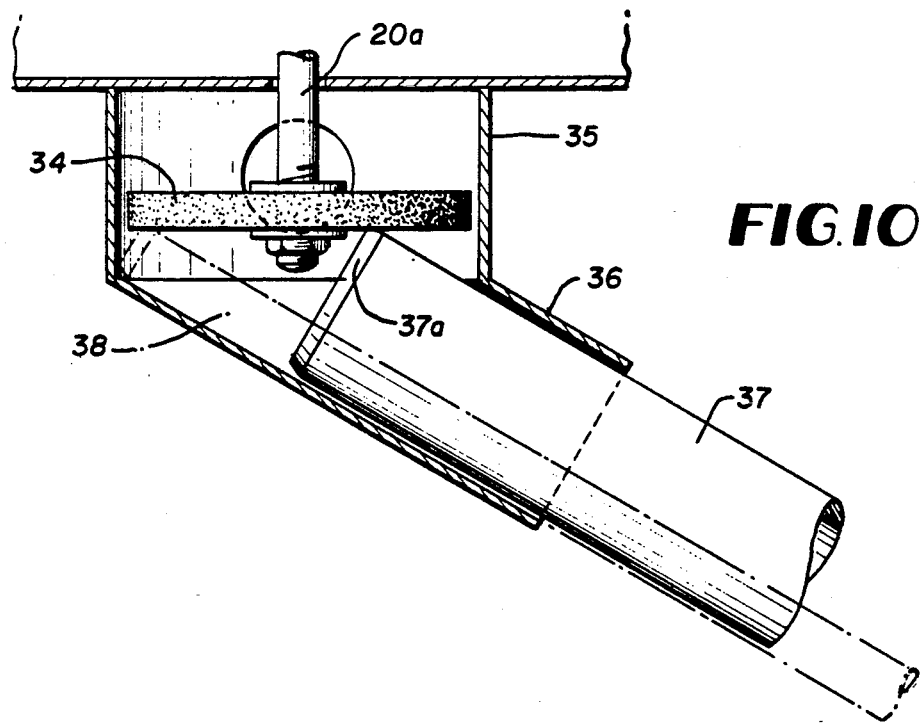
FIG. 10 is a view taken along line 10—10 of FIG. 9.

At times it is desirable to provide a pipe end with a completely bevelled or tapered end portion; that is, a pipe end with no radial surface. The machine of the present invention is provided with such a tool, as shown in FIG. 10, wherein an abrasive wheel 34 is secured to the end of the shaft 20a and positioned within a housing 35 having an inclined entrant portion 36 whereby a pipe 37 to be bevelled is manually moved into the entrant portion 36 until the end thereof abuts the face of the rotating abrasive wheel 34, to thereby form the bevelled surface 37a. As illustrated in FIG. 10, the housing 35 and entrant portion 36 are dimensioned to accommodate large pipes such as pipe 37 and smaller pipes 38, shown in phantom.

Figure 13:
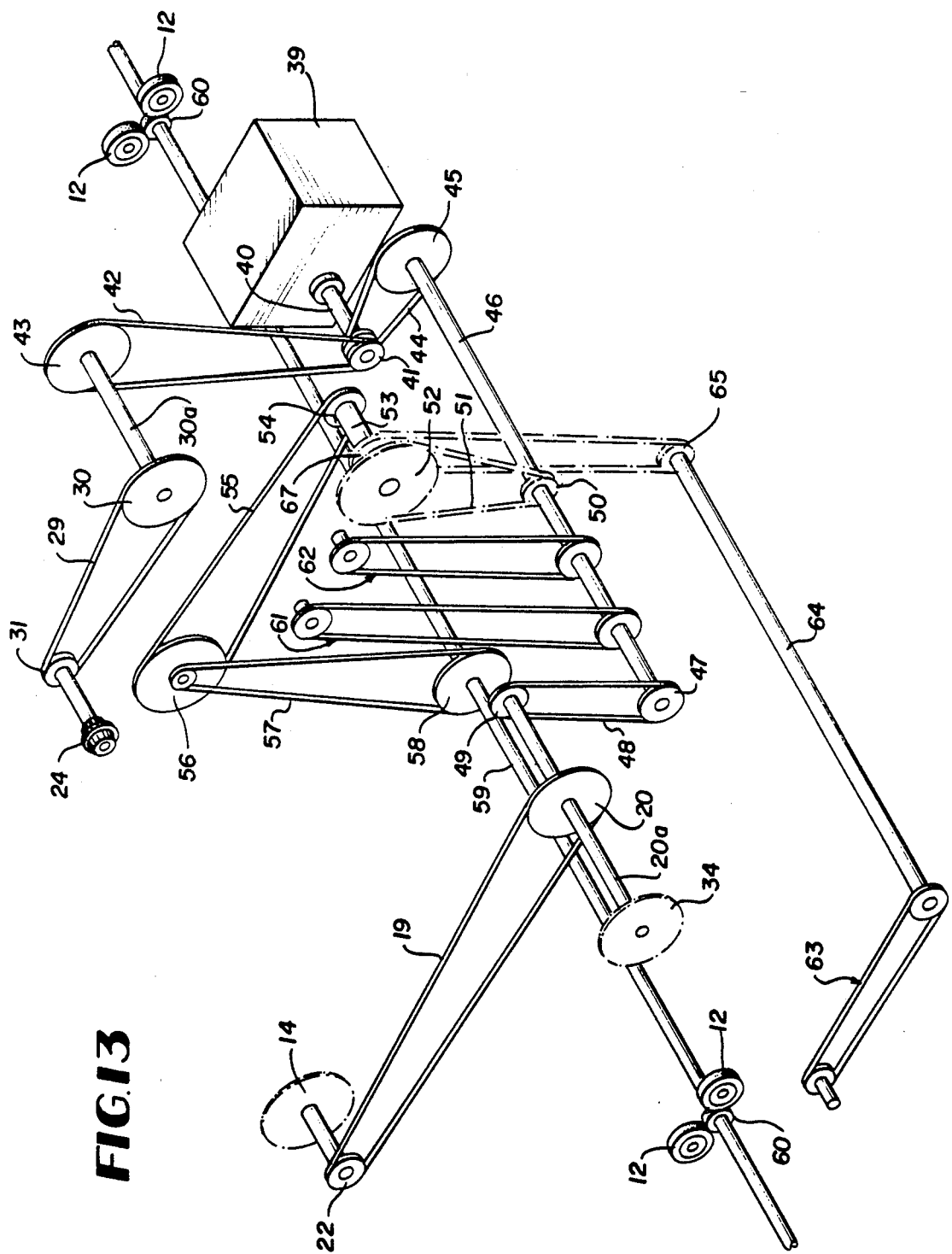
FIG. 13 is a diagrammatic view of the power train from the internal combustion engine to the cutting tools, support rollers, pumps and air compressor.

One of the features of the machine of the present invention is the provision of a single power source to drive the pipe support rollers 12, the cutters 14 and 24, the abrasive wheel 34, and the various pumps employed for the laying and testing of sewer, water and gas lines. As will be seen in FIG. 13, an internal combustion engine 39 is provided. The output shaft 40 of the engine is provided with a double-spool pulley 41 having a drive belt 42 connected to pulley 43 secured to shaft 30a, which is operatively connected to the bevelling cutter 24. The double-spool pulley 41 also has another drive belt 44 connected thereto and extending to a driven pulley 45 connected to one end of a shaft 46 having another pulley 47 at the opposite end thereof which is connected to the shaft 20a through a belt 48 and a pulley 49 connected to the end of shaft 20a, whereby the circular saw 14 and abrasive wheel 34 are driven.

In order to drive the pipe support rollers 12, a sprocket wheel 50 is secured to shaft 46, and a chain 51 extends from the sprocket wheel 50 to another sprocket 52 secured to the end of a stub shaft 53, the opposite end of the shaft 53 having a pulley 54 connected thereto. A belt 55 extends from the pulley 54 to a double-spool pulley 56, having a second belt 57 extending therefrom to a pulley 58 secured to a longitudinally extending shaft 59. Drive rollers 60 are secured to the shaft 59 and frictionally engage the pipe support rollers 12 to rotate them.

To drive the air compressor and hydraulic pump, the power take-off shaft 46 is operatively connected to these components through pulley and belt assemblies 61, 62. The mud pump is driven by a pulley and belt assembly 63 connected to a shaft 64 having a sprocket 65 on the end thereof which is driven by a chain 66 connected to a sprocket 67 secured to the stub shaft 53. It will be understood by those skilled in the art that suitable clutches and clutch actuating levers will be provided in the drive train whereby the various components can be selectively actuated.

To complete the structural description of the machine of the present invention, as will be seen in FIG. 5, the chassis frame is constructed and arranged for storing and supporting a manhole test cover 68, a storage box 69 for a meter employed with the hydrostatic pump, a tool box 70, a compressed air tank 71, a compartment 72 for the engine 39 and air compressor, and a pumping station 73. As will be seen in FIGS. 5, 15, 16 and 17, additional storage is provided by longitudinally extending elongated tubes 74 for containing various hoses 75, and another tubular housing 76 for storing a pressure gauge assembly 77.

From the above description, it will be appreciated by those skilled in the art that the multi-purpose pipeline construction and testing machine of the present invention effectively replaces approximately nine other machines and/or tool assemblies which heretofore had to be transported individually to the job site. The internal combustion engine 39 provides a single power source for driving the pipe support rollers 12, the cutters 14 and 24, the abrasive wheel 34, as well as a water pump, a hydrostatic pump, and an air compressor.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A multi-purpose pipeline construction and testing machine comprising a trailer adapted to be towed to a job site, said trailer including a chassis frame, an internal combustion engine mounted on said chassis frame, drive rollers rotatably mounted on said frame and adapted to rotatably support a pipe to be cut, said internal combustion engine being operatively connected to said drive rollers, a circular saw mounted on said chassis for cutting a pipe supported on said drive rollers, said internal combustion engine being operatively connected to said circular saw, a bevelling cutter mounted on said chassis for cutting a pipe supported on said drive rollers, said internal combustion engine being operatively connected to said bevelling cutter, and an abrasive wheel rotatably mounted on said chassis for bevelling the end of the pipe, said internal combustion engine being operatively connected to said abrasive wheel, said abrasive wheel comprising a housing secured to said chassis frame, said abrasive wheel being rotatably mounted in said housing, an inclined tubular entrant portion provided in said housing communicating with the face of the abrasive wheel, said entrant portion supporting the end portion of a pipe to be bevelled, whereby a pipe to be bevelled is manually moved into the entrant portion until the end thereof abuts the face of the rotating abrasive wheel, to thereby form a bevelled surface on the end of the pipe.

2. A machine according to claim 1 wherein a water pump, a hydrostatic pump and an air compressor are mounted on said chassis frame and operatively connected to said internal combustion engine.

3. A machine according to claim 1, wherein the circular saw comprises a pedestal rigidly connected to the chassis frame, an arm having one end pivotally connected to said pedestal, said circular saw being rotatably mounted on the opposite end of said arm, and spring means connected between the arm and the chassis frame for biasing the circular saw to the non-cutting position.

4. A machine according to claim 1, wherein the bevelling cutter comprises a pedestal rigidly connected to the chassis frame, an arm having one end pivotally connected to said pedestal, said bevelling cutter being rotatably mounted on the opposite end of said arm, and spring means connected between the arm and the chassis frame for biasing the bevelling cutter to the non-cutting position.

5. A machine according to claim 1, wherein the chassis frame is constructed and arranged for removably supporting a manhole test cover, and storage compartments for tools and hoses.

* * * * *